United States Patent [19]
Fischer et al.

[11] Patent Number: 5,978,121
[45] Date of Patent: Nov. 2, 1999

[54] METHOD AND DEVICE FOR THE OPTICAL TRANSMISSION OF DATA OVER DISTANCES IN SPACE

[75] Inventors: Edgar Fischer, Müllheim Dorf; Reinhard Czichy, Eggersriet, both of Switzerland

[73] Assignee: Oerlikon Contraves AG, Zürich, Switzerland

[21] Appl. No.: 08/882,267

[22] Filed: Jun. 25, 1997

[30] Foreign Application Priority Data

Nov. 25, 1996 [CH]  Switzerland .......................... 2905/96

[51] Int. Cl.⁶ .................................................. H04B 10/00
[52] U.S. Cl. .......................... 359/156; 359/172; 359/190
[58] Field of Search ................................... 359/122, 156, 359/159, 172, 190

[56] References Cited

U.S. PATENT DOCUMENTS

| 4,867,560 | 9/1989 | Kunitsugu | 359/159 |
| 5,530,577 | 6/1996 | Orino et al. | 359/159 |
| 5,627,669 | 5/1997 | Orino et al. | 359/156 |

FOREIGN PATENT DOCUMENTS

| 0365028 | 10/1989 | European Pat. Off. . |
| 0653853 | 5/1995 | European Pat. Off. . |

OTHER PUBLICATIONS

R.T. Carlson et al., "Monolithic Glass Block Lasercom Terminal: Hardware Proof of Concept and Test Results", SPIE, vol. 2381, pp. 90–102, Sep., 1995.

Jeffrey C. Livas et al., "High Data Rate Systems for Space Applications", SPIE, vol. 2381, pp. 38–47, Sep., 1995.

V. Napasab et al., "Polarization Recombing: A New Automatic Polarization Control Scheme for Heterodyne or Homodyne Optical Receivers", Journal of Optical Communications, vol. 9, pp. 102–107, Sep., 1988.

Primary Examiner—Kinfe-Michael Negash
Attorney, Agent, or Firm—Browdy and Neimark

[57] ABSTRACT

The instant invention relates to a method and a device and its opto-mechanical structure for the optical transmission of data over free space distances, using the principle of phase modulation of a lightwave generated by a laser and by a homodyne superimposition in a photodector of a lightwave from a second laser on the received lightwave.

13 Claims, 3 Drawing Sheets

METHOD AND DEVICE FOR THE OPTICAL TRANSMISSION OF DATA OVER DISTANCES IN SPACE

FIELD OF THE INVENTION

The instant invention relates to a method and a device and its opto-mechanical structure for the optical transmission of data over free space distances, using the principle of phase modulation of a lightwave generated by a laser and by a homodyne superimposition in a photodector of a lightwave from a second laser on the received lightwave.

FIELD OF THE INVENTION

In the past years, optical data transmission using optical waveguides has revolutionized the line-dependent transmission of data, in particular over long transmission distances. The technology developed in the course of this promises large increases in efficiency of the transmission technology, which is not depending on lines, provided the interfering effects of the earth's atmosphere can be removed. While on the surface of the earth the selection of the wavelength of a light source suitable for this promises some success, in space the limits of such a transmission system are hardly affected by environmental influences and mostly depend on the properties of the used system itself. It is therefore possible in connection with communications between satellites to fully utilize the great advantages of optical communication technology, namely a theoretically extremely large bandwidth of the channel, together with small and light weight systems, which nevertheless allow the transmission of extremely closely bundled beams as well as a reception with high directional resolution.

In addition, the output requirements needed for communications are considerably reduced by the latter properties. In the simplest embodiment of a digital optical transmission system, the modulation of an optical source is performed by switching it on or off, which is a function of the logical state of the data bit to be transmitted. Reception takes place by means of a photodiode, which converts the data-dependent intensity of the light into a data-dependent photo current, which is electronically amplified and processed further. If further extraneous effects are excluded, it is possible with this simple method to transmit data with an error probability of $10^{-9}$, provided that an average of 10.5 photons are (theoretically) available for each data bit. But this value is never achieved to any large degree in actual operations. To fully utilize the output of an optical source at any time during transmission, the phase of the lightwave is influenced, instead of its amplitude. Differential phase modulation, known from fiber optics and radio technology (J. C. Livas et al., "High Data Rate Systems for Space Applications", SPIE, vol. 2381, pp. 38 to 47), is used in a system which was recently presented.

In this case the output of a weak received light signal is initially increased in a quantum-optical amplifier and is subsequently split into two optical paths of different length and superimposed again in a coupler, both of whose output gates are respectively connected with a photodiode. Depending on the phase position of the lightwaves superimposed in the coupler in respect to each other, the resultant light output is distributed to the two photodiodes. Because an optical path retards the light for the length of a data bit, the respective phases of two bits transmitted one after the other are compared with each other. By means of appropriate coding and of a phase difference of respectively 0 or 180 degrees, respectively one of the two photodiodes will receive the full light output, depending on the data bit. In the course of the optical and mechanical realization of such systems, a reduced weight of the appropriate arrangement and the smallest possible space requirements are sought, besides the required dependability. For example, Carlson et al. suggest the integration of optical elements in a quasi monolithic glass block (T. T. Carlson et al., "Monolithic Glass Block Lasercom Terminal: Hardware, Proof of Concept and Test Results", SPIE, vol. 2381, pp. 90 to 102). Different optical elements packaged in glass cubes of standardized size are combined in a block, which can then be considered to be a type of an optical circuit.

For example, embedded mirrors are available which divert the light by 90 degrees, separate it in accordance with different polarizations, filter out specific wavelengths and allow the manipulation of the polarization of the penetrating light by means of liquid crystals.

In this connection the fact is disadvantageous that the beam path inside the block can no longer be manipulated by exterior intervention and that appropriately collimated beams must be available for the entire optical circuit at the interfaces. The divergence of these beams should not be crucial because of the compact design of the optical circuit and the short optical paths connected therewith. However, this device does not do away with the non-integratable telescope for sending and receiving the corresponding light beams.

The comparatively large and massive glass block also has a disadvantageous effect, because in principle it cannot be optimized so that it can withstand the loads applied during a rocket start without damage.

The effect of remote light sources, for example from the sun, has a disadvantageous effect on the data transmission by means of amplitude modification, and must be kept away from the detectors by narrow-band optical filters. In general, a previous amplification by means of quantum-optical amplifiers is required for the reception of amplitude-modulated signals as well as for the detection of signals encoded by means of differential phase modulation, whose intrinsic noise caused by spontaneous emissions in turn must be reduced by means of narrow-band optical filters.

OBJECT AND SUMMARY OF THE INVENTION

It is therefore the object of invention, which will be explained in what follows, to avoid the disadvantages of the prior art and to assure weight-saving as well as a mechanically and thermally rugged arrangement of the optical elements required for optical transmission systems.

The invention also relates to the opto-mechanical structure of an optical free space transmission system for the digital communications between satellites in space. The phase-modulation of a light source generated by a laser is employed as the transmission principle, whose detection is performed in a photo detector by the homodyne superimposition of a lightwave from a second laser on the received lightwave. The optical homodyne reception, which means the superimposition of a received light signal of a lightwave of the same frequency as the carrier of the received light signal, is one of the most sensitive detection methods and provides greater insensitivity to external light of a generally different optical frequency. With the exception of the mirrors needed for the rough alignment of the transmission beam and the received beam, the individual elements of the optical system are combined in one unit consisting of several sub-units, which contain the optical elements, which are arranged in individual optical paths, in tube-shaped holders.

All tube-shaped holders are held together on one metallic and flat structure, and the collimated beams emanating from them or to be introduced into these holders are conducted parallel with this plane by means of deflection mirrors. Since in most cases a sensor provided with an electronic device or an electromechanical actuator can be found at the end point of an optical path conducted through a tube-shaped holder, the heat generated by this is conducted away through the tube-shaped holder. In contrast to the mechanical arrangement of different optical paths in monolithic structures, the heat flow is therefore globally restricted to one direction. Since a heat flow always causes temperature gradients, and different temperatures also generate a different heat expansion of solid bodies, the restriction of the heat flow to globally one direction may possibly cause different longitudinal expansion of different tube-shaped holders, but because of the lack of a lateral mechanical connection it leads to the absence of bending moments which would lead to a curvature of the optical paths, which would be very damaging to the efficiency of optical systems.

The flat metallic structure connecting all tube-shaped holders passes the heat on, which flows to it from the tube-shaped holders connected with it, so that no heat gradient, which would cause a bending moment because of different heat expansion and which would arch the flat metallic structure, is created because of the negligible thickness of the material of this structure in the axial direction of the tube-shaped holders.

A further characteristic of the invention is the separation of the components creating the most waste heat in order to achieve a further reduction of thermally caused effects on the operational behavior of the entire arrangement. To this end the required lasers, modulators and partially quantum-optical amplifiers are housed in another holder, and their emissions are conducted to the lens system by means of optical wave guides.

Thus, the advantages of the arrangement in accordance with the invention are the reduction of the effects of large heat sources on the functional ability of the lens system, one the one hand by separating the quantum-optical light sources and amplifiers, as well as modulators, acting as the largest heat sources, on the other hand by a mechanical design of the arrangement which minimizes the effects of inhomogeneous expansions caused by heat sources. The realization of comparatively long optical paths, while preserving the thermal and mechanical stability of the arrangement, can be cited as a further advantage.

Further details, features and advantages of the invention ensue not only from the claims and the characteristics taken from them either individually or in combination, but also from the following description of a preferred exemplary embodiment.

DETAILED DESCRIPTION OF THE PREFERRED EMBODIMENT

Figure 1:
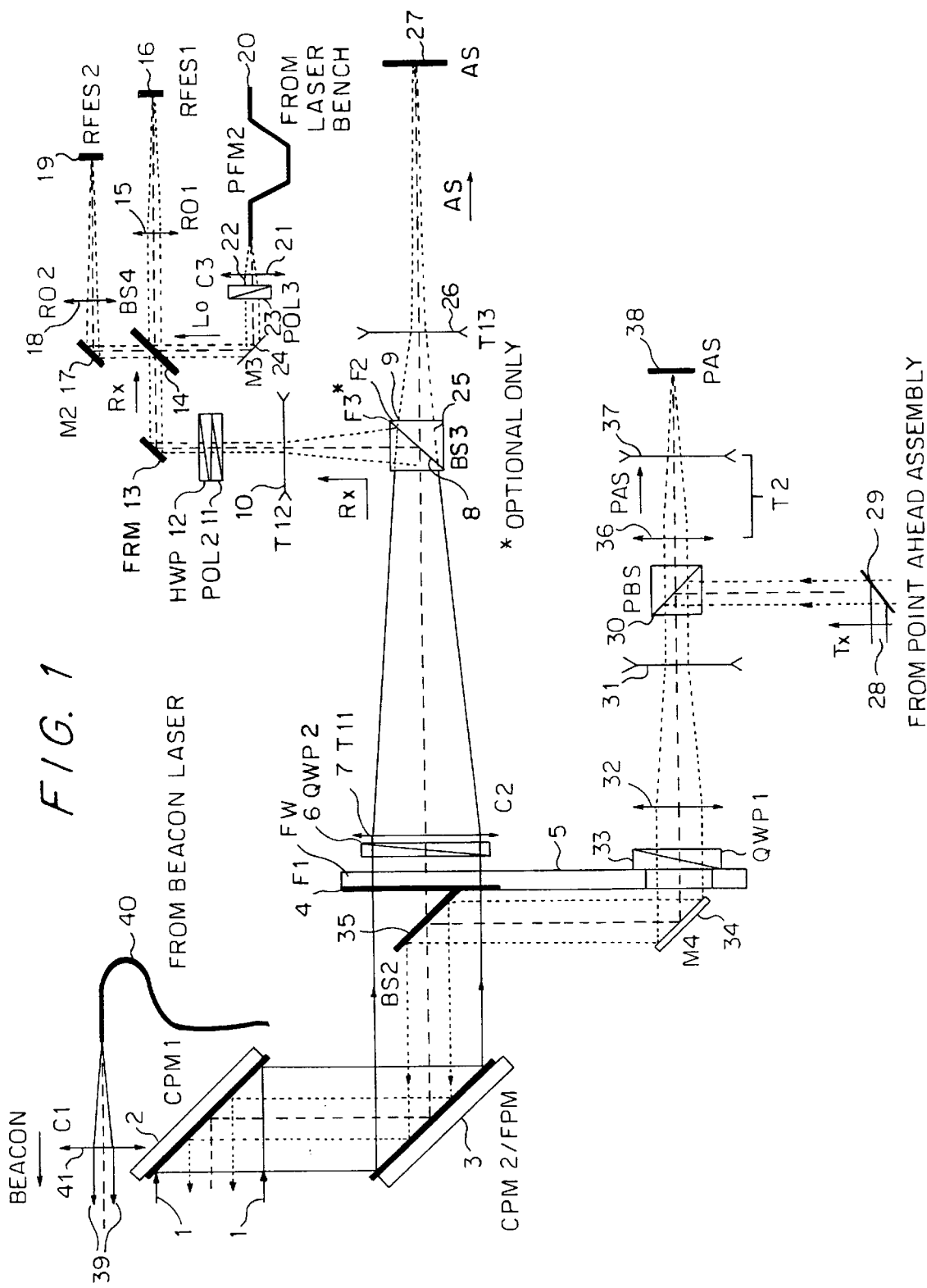
FIG. 1 shows a basic diagram of the optical arrangement for the directed transmission and directed reception of optical communications signals.

A diagram is shown in FIG. 1, which represents the mode of operation of the lens system of a free space communication system. A light signal 1 transmitted from a remote station is directed to a first optical filter 4 via a first mirror 2 and a second mirror 3, both of which are seated mechanically movable in a periscopic arrangement for the rough setting of the sending and receiving direction. The first optical filter 4 is attached to a quartz glass plate 5 used as a support and only transmits the optical wavelengths provided for data transmission and for a special acquisition device. Here the main job of the quartz glass plate 5 is to be a radiation protector of the lens system disposed behind it and of the evaluation sensors. The light of the light signal 1 used for communication is circularly polarized and is provided with a definite linear polarization during the passage through a quarter-wave plate 6. By means of a first collector lens 7 the light signal is subsequently sent bundled on a first dichroic beam splitter 8 and is deflected by 90 degrees by reflection, by means of this is directed through a second optical filter 9, optionally attached to the corresponding surface of the first beam splitter 8, to a first scatter lens 10 and is forwarded as a collimated beam. A first polarization filter 11 removes undesired polarized light, a half-wave plate 12, through which the beam 1 subsequently passes, makes the exact setting of its polarization direction possible. Following further reflection at a third mirror 13, which is movably designed for fine tuning, the light beam 1 is separated into two partial beams of even strength at a second beam splitter 14 and, following a second collector lens 15, is turned directly on a first detector 16 and indirectly, following a second reflection on a fixedly set fourth mirror 17 and a third collector lens 18, on a second detector 19.

In the course of the transfer from the acquisition with the luminous beacon to the tracking signal, first a directed search movement of the third mirror 13 might possibly be required, so that the received off-centered light spot is moved to the center of the tracking detector. In the course of this the light spot may also be located at first outside the field of vision of the coherent detectors 16, 19.

By means of an optical waveguide 20 which maintain the polarization, the light of a laser used as the local oscillator is directed on the fourth collector lens 21 and is directed in the form of a collimated beam 22 through a second polarization filter 23 via a fixedly set deflection mirror 24 on the second beam splitter 14, because of which two collimated light beams are created, which are superimposed on the two partial beams created from the light beam 1. An electrical data signal is obtained in both detectors 16 and 19 from the detection of a photo current resulting from this superimposition of two light sources. In order to reduce the direct current which also is generated by this process to the smallest required size, it is attempted to match the electrical field distribution of the local oscillator light beam over its cross section to that of the light beam 1 after passage through the first scatter lens 10. Furthermore, the half-wave plate 12 permits an adaptation of the polarization of the light beam 1 to that of the local oscillator light beam. A light beam generated by an optical beacon of the remote station reaches the first beam splitter 8 on the same optical path as the light signal 1. Since this light beam is radiated on a different wave length in order to make possible the efficient employment of silicon detectors, the quarter-wave plate 6 operates other than intended, and an arbitrarily polarized light beam appears at the first beam splitter 8, which appears to be transparent to the beacon light, where it impinges on an optical filter 25 attached to the corresponding plane, which lets only the wavelength of the beacon light pass. Following a second scatter lens 26, the light beam of the beacon of the remote station impinges on a CCD sensor 27. The geometric separation from the received beam path is already necessary for preventing self-dazzling.

The barrel-shaped distortion of the image of an object which is found in uncorrected optical imaging systems can be used purposely here for increasing the angular resolution of the sensor system in case of small deviations from the optical axis at the expense of the edge areas.

For the control of a lead angle in respect to the received light beam 1, which is necessary because of the possible relative movement of two stations in respect to each other, a transmitted beam 28 is directed via a movable fifth mirror 29 on a polarization beam splitter 30, is reflected in it in the direction of two further lenses 31 and 32, which widen the beam, and is then passed through a second quarter-wave plate 33. The light beam passes through the quartz glass plate 5 in a bore cut for this purpose, whose edge is blackened in order to prevent interference by the scattered light of the very powerful transmitting beam 28 with the received light beam 1, which is also passed through the quartz glass plate 5. Incidentally, the lateral extension of the transmitting beam 38 is limited so that, after passing through the mirrors 34 and 35, which are disposed in a rhomboid form on the quartz glass plate 5, and being conducted on the mirrors 2 and 3, which are also used by the received light beam, it does not affect the received light beam by back-scattering at the surfaces of the mirrors 2 and 3, wherein the mirror 35 simultaneously performs the function of a diaphragm for such back-scattered light. Based on the considerably narrower diameter of the transmitting beam compared with the diameter of the receiving beam, misdirection errors of the adjusting mirrors are less important.

In addition to this, an electronic communication between the mirror 13 and the mirror 29 takes place, so that the mirror 13 reports a momentary deflection of the mirror 29, so that the mirror 29 can correct its "erroneous vision". The adjustment range of the mirror 29 is comparatively large, so that it is also possible to correct, besides the lead angle, tolerances caused during production.

The sensitive electronic sensor system is placed in close vicinity of the sensors provided on the optical bank. However, this electronic system is separated from the optical bank, it has no thermal contact in particular.

A small proportion of the optical output of the transmitting beam is reflected on the specially coated or uncoated side of the second quarter-wave plate 33 facing the quartz glass plate 5, passes a second time through the second quarter-wave plate 33 and is guided, turned by 90 degrees from it originally linear polarization, through the polarization beam splitter 30 and a fourth collector lens 35 and a scatter lens 37 to a sensor 38 for measuring the lead angle.

A beacon light beam 39 is radiated parallel with the received light beam 1, and its light is provided by means of an optical wave guide 40 coming from a beacon laser and is collimated by means of a collector lens 41, i.e. important heat sources (laser) are separated and connected via flexible optical wave guides 40. By means of this it is furthermore achieved that a simplified system structure is possible and the susceptibility to becoming unadjusted is removed.

Figure 2:
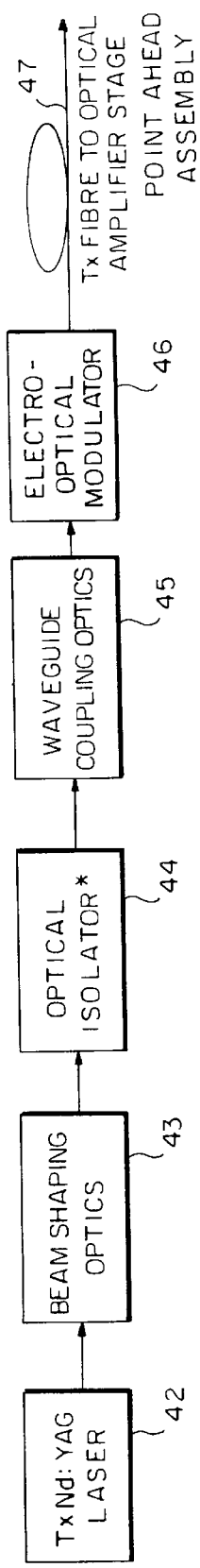
FIG. 2 is a block diagram of the entire arrangement for generating the modulated transmission light.

The generation of modulated transmitting light is represented in FIG. 2. A diode-laser-pumped Nd:YAG laser 42 generates highly coherent light, which moves through a beam-shaping optical system 43 and an optical insulator 44 in order to be subsequently guided via a lens system 45 coupling to an optical wave guide to an electro-optical phase modulator 46. The optical wave guide on the output side of the latter is connected with an optical fiber 47, which transmits only one mode and maintains the polarization of the light guided in it.

Figure 3:
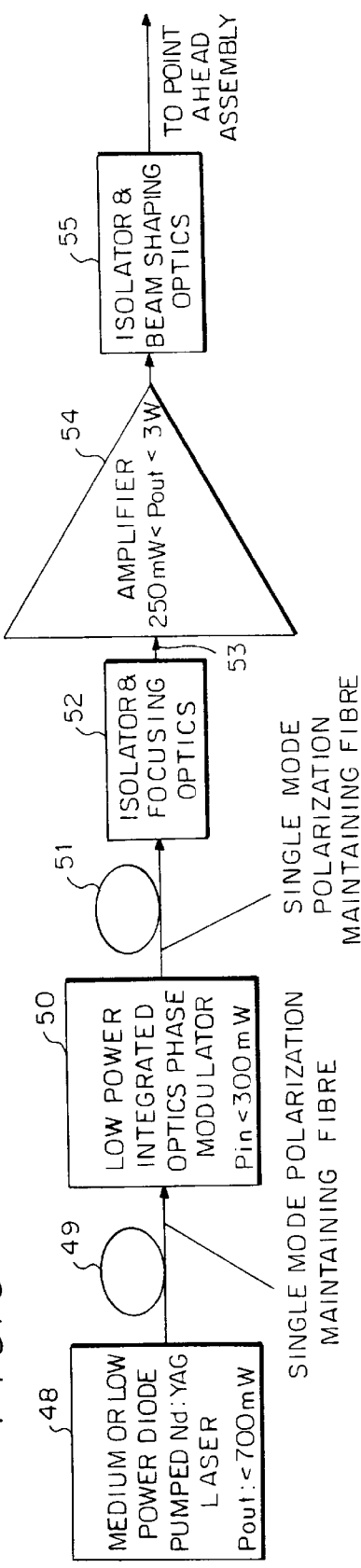
FIG. 3 is a block diagram of an alternative concept for generating the transmission light.

An alternative concept is represented in FIG. 3. A diode-laser-pumped Nd:YAG laser 48, which radiates a medium or weak output, conducts its light output through a polarization-maintaining single-mode optical wave guide 49 into a phase modulator 50, which is designed for only low optical output and whose output is connected via a polarization-maintaining single-mode optical waveguide 51 with an optical insulator 52, which in addition contains a focusing lens system and generates a collimated beam 53 at the output side, which is sent through a quantum-optical amplifier 54 and an optical insulator 55, containing lens systems shaping the beam, to the device for setting the lead angle. While the Nd:YAG laser 48 generates an output of maximally 0.7 Watts, this output is reduced in the phase modulator 50 to less than 0.3 W, and is subsequently increased in the quantum-mechanical amplifier 54 up to 3 W.

Figure 4:
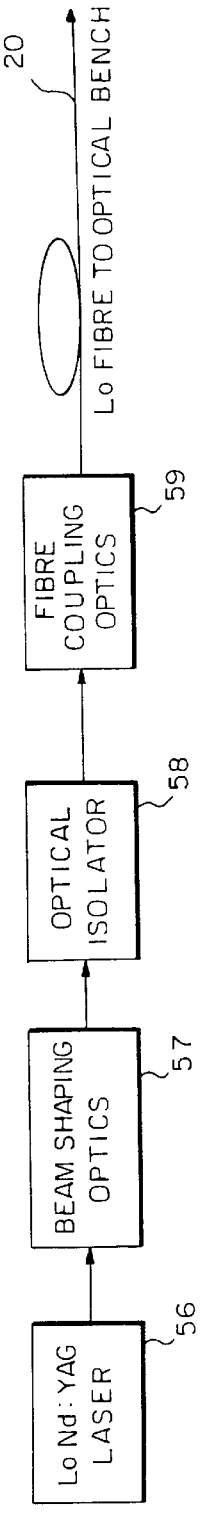
FIG. 4 is a block diagram of the generation of the light to be superimposed on the received light beam.

FIG. 4 shows the less complicated block diagram of an arrangement for the generation of the superimposed light-wave needed in the optical receiver. The lightwave is unmodulated and only needs to correspond in its center frequency exactly with the carrier frequency of the transmitted light. A diode-laser-pumped Nd:YAG laser 56 operates as a quantum-optical local oscillator laser, whose light is guided via a beam-shaping lens system 57, an optical insulator 58 and an optical fiber coupling device 59 on the polarization-maintaining optical wave guide 20.

Figure 5:
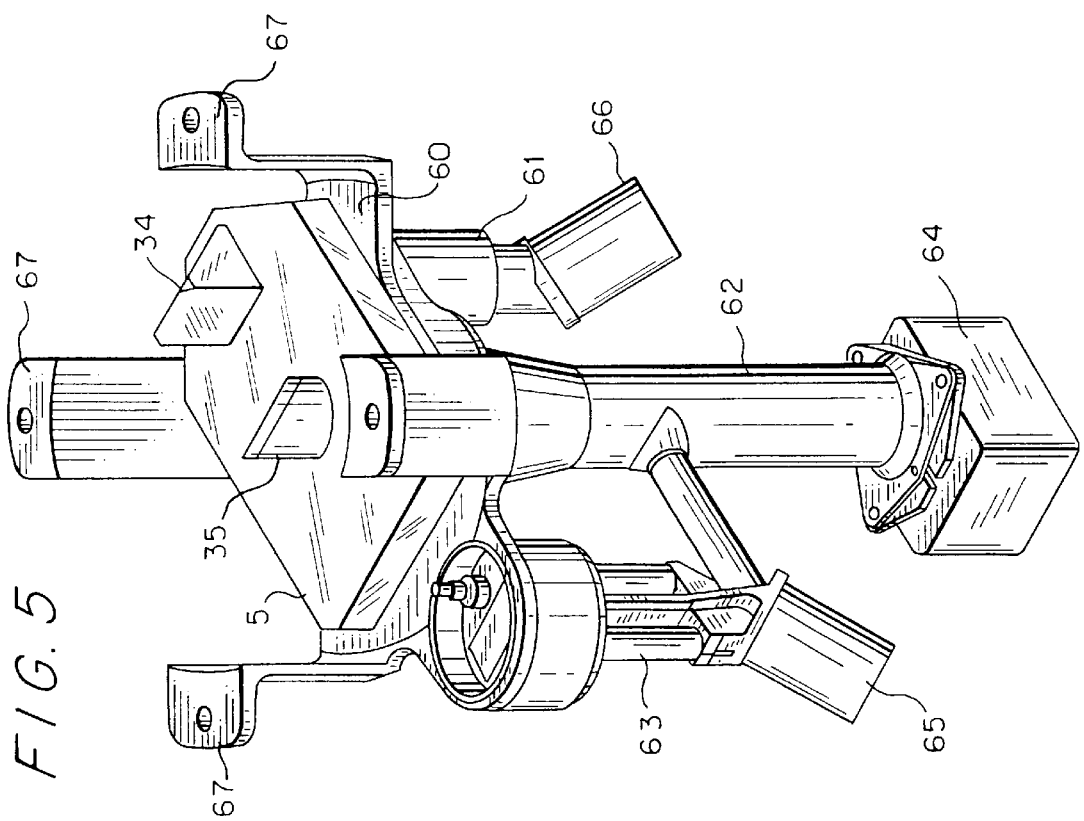
FIG. 5 is an external view of the mechanical structure of the optical bank.

FIG. 5 shows the exterior view of an optical bank, wherein tube-shaped holders 61, 62 and 63 are attached to a metallic flat structure 60. The housing 64 contains the CCD sensor 27 provided for acquisition as well as the electronic devices necessary for this sensor and therefore constitutes a heat source. A housing 66 furthermore contains the movably-designed third mirror 13 and its drive. The movable mirror 29 for controlling the lead angle of the transmitting beam is located in a housing 66. The metallic flat structure 60 is connected by means of mounting bases 67 with the housing of the entire apparatus, wherein a thermally caused lateral expansion of the metallic flat structure 60 only causes very small bending moments, emanating from the prestressed mounting bases 67, on the metallic flat structure 60. The quartz glass plate 5 and the two mirrors 34 and 35 are located on the metallic flat structure 60, wherein the glass body of the mirror 34 simultaneously covers the bore applied to the quartz glass plate 5 for the passage of the transmitting beam. Since quartz glass and the material used for the metallic flat structure generally have different heat expansion coefficients, temperature fluctuations arise, as well as mechanical shear stresses, in particular with temperature differences between the quartz glass plate 5 and the metallic flat structure 60, which must be absorbed by appropriate connecting techniques.

Figure 6:
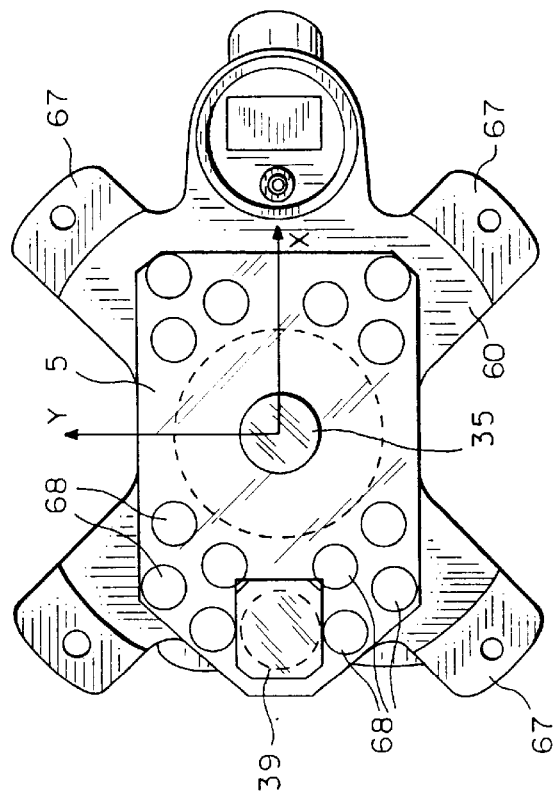
FIG. 6 shows the connection of a quartz glass plate with a metallic flat structure.

The connection of the quartz glass plate 5 with the metallic flat structure 60 is represented in FIG. 6. The connection is provided by means of several zones 68, which contain a thin layer of a silicon adhesive which, thanks to its elasticity, absorbs shear stresses without high corresponding mechanical stresses.

What is claimed is:

1. A method for optical transmission of data over free space distances, using phase modulation of a lightwave generated by a laser and detected in a photodetector by a homodyne superimposition light from a second laser with the received lightwave, the method comprising steps of:

transmitting the lightwave, in a transmitting beam from a transmitter, with circular polarization;

in a received beam to a receiver, converting the lightwave with the circular polarization into linearly polarized light having a polarization direction which is unchanged by relative turning of the transmitter around an axis defined by a radiation direction of the transmitting beam;

aligning a reception direction to the radiation direction; and preventing backscattering at the mirror surfaces into the received beam by a masking effect of a mirror which reflects the transmitting beam and is disposed coaxially with the received beam.

2. The method for the optical transmission of data over free space distances in accordance with claim 1, comprising detecting the reception direction by use of a beacon light, wherein a light beam of the beacon is guided onto a CCD sensor (27), and using a barrel-shaped distortion of an image of an object for increasing angular resolution with negligible deviations from an optical axis at the expense of edge areas.

3. The method for the optical transmission of data over free space distances in accordance with claim 2, comprising preventing a blinding effect on the CCD sensor (27) by its own beacon light by a geometric beam separation.

4. A device for executing the method in accordance with claim 1, comprising:

mechanically movable mirrors (2, 3), reflecting the received beam onto an optical filter (4) and a first quarter-wave plate (6) and a compensator (30, 31, 32, 33, 34) of the radiation direction of the transmitting beam (28), which compensates possible relative movements between two stations comprising the transmitter and the receiver; and a first mirror (34) and a second mirror (35) arranged in a rhomboid shape on a quartz glass plate (5), whereby self-compensation of the transmitting beam direction in respect to tilting is provided.

5. The device in accordance with claim 4 wherein the transmitting beam (28) is conducted to a remote station via a fifth movable mirror (29), which is connected with a measuring device (30, 36, 37) and a sensor (38) for determining a lead angle.

6. The device in accordance with claim 5, wherein the fifth movable mirror (29) is electronically connected with a second mirror (13) through which a tracking signal is obtained, and the lead angle of the transmitting beam (28) is controllable as a function of an off-centered reception of the receiving beam (1).

7. The device in accordance with claim 6, wherein optical elements are combined in optical paths in tube-shaped holders which are commonly fastened at one end thereof to a metallic flat structure, whereby heat flow in the tube-shaped holders takes place in only one direction and bending stresses because of heat expansion caused by existing temperature differences are prevented.

8. The device in accordance with claim 7, wherein exterior openings of all the tube-shaped holders are covered for radiation protection by the quartz glass plate (5), which is coupled to the metallic flat structure.

9. The device in accordance with claim 8, wherein a connection between the metallic flat structure and the quartz glass plate comprises an elastic radiation-resistant connection allowing shear movements free of stresses.

10. The device in accordance with claim 4, wherein optical elements are combined in optical paths in tube-shaped holders which are commonly fastened at one end thereof to a metallic flat structure, whereby heat flow in the tube-shaped holders takes place in only one direction and bending stresses because of heat expansion caused by existing temperature differences are prevented.

11. The device in accordance with claim 10, wherein a connection between the metallic flat structure and the quartz glass plate comprises an elastic radiation-resistant connection allowing shear movements free of stresses.

12. The device in accordance with claim 4, wherein exterior openings of all the tube-shaped holders are covered for radiation protection by the quartz glass plate (5), which is coupled to the metallic flat structure.

13. The method for the optical transmission of data over free space distances in accordance with claim 1, wherein the step of aligning comprises providing periscopically arranged mirrors reflecting the transmitting beam and the received beam.

* * * * *